United States Patent [19]
Cvitkovich

[11] 3,971,304
[45] July 27, 1976

[54] DUAL COMPARTMENT BEVERAGE URN

[75] Inventor: Mary Cvitkovich, Bellerose, N.Y.

[73] Assignee: Lawrence Peska Associates, Inc., New York, N.Y.; a part interest

[22] Filed: Feb. 28, 1975

[21] Appl. No.: 554,074

[52] U.S. Cl. .................................. 99/291; 99/316
[51] Int. Cl.² ........................................ A47J 31/00
[58] Field of Search ............ 99/310, 290, 291, 295, 99/311–312, 313–314, 315, 316, 298

[56] References Cited
UNITED STATES PATENTS

| | | | |
|---|---|---|---|
| 763,401 | 6/1904 | Januliewicz | 99/291 |
| 795,408 | 7/1905 | Nebinger | 99/290 |
| 2,493,932 | 1/1950 | Swanson | 99/291 X |
| 2,617,352 | 11/1952 | Olson et al. | 99/322 UX |

FOREIGN PATENTS OR APPLICATIONS

| | | | |
|---|---|---|---|
| 11,117 | 9/1908 | United Kingdom | 99/291 |

*Primary Examiner*—Leonard D. Christian
*Assistant Examiner*—Arthur O. Henderson

[57] ABSTRACT

A dual compartment urn for providing heated beverages, comprising:
- a. a cylindrical body defining an interior space;
- b. a single continuous partition member disposed in said space and dividing said space into first and second compartments, said partition member and said cylindrical body comprising an integral structure whereby the respective contents of said compartments are confined thereto;
- c. separate spout means on said cylindrical body; and communicating with said first and second compartments, respectively; and
- d. heating means disposed at said cylindrical body so as to be in heat transfer relationship with said respective contents of said first and second compartments.

5 Claims, 3 Drawing Figures

U.S. Patent  July 27, 1976  3,971,304
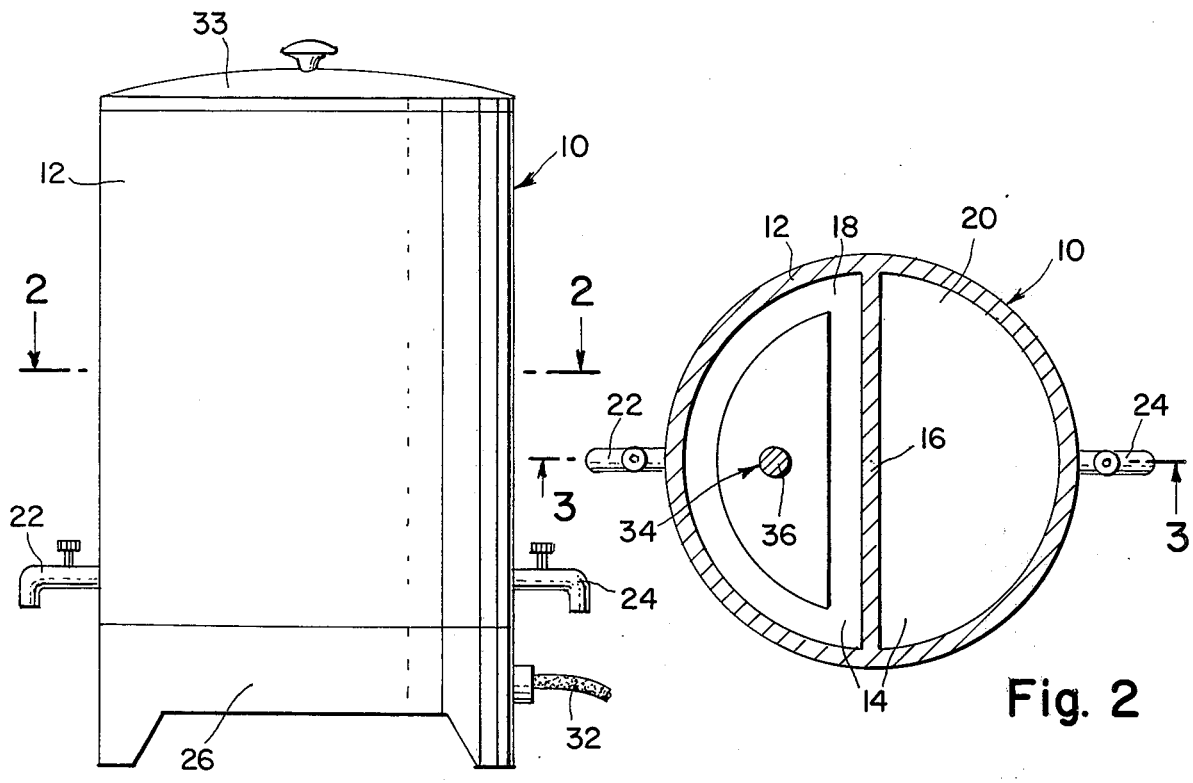
Fig. 1
Fig. 2
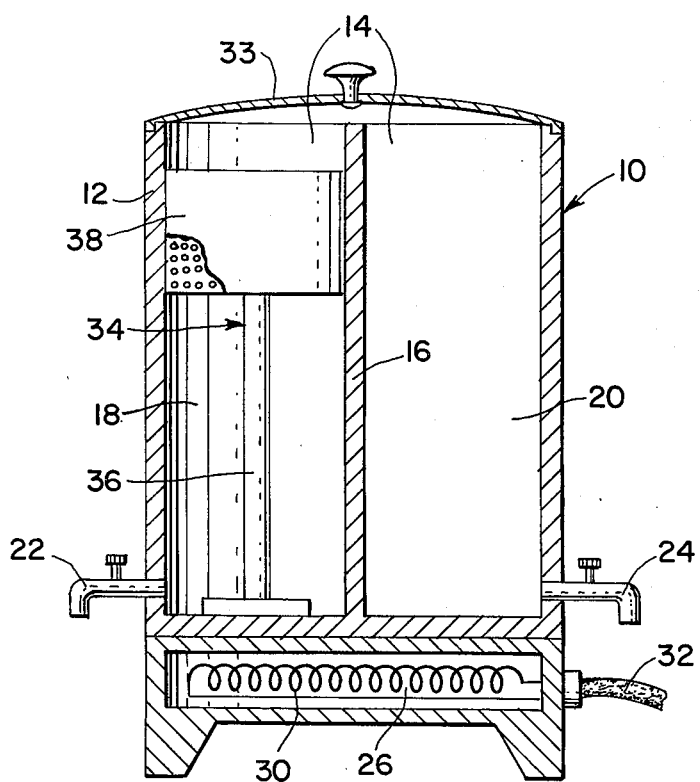
Fig. 3

DUAL COMPARTMENT BEVERAGE URN

BACKGROUND OF THE INVENTION

The present invention relates to a dual compartment beverage urn.

Prior art devices for holding heated beverages generally tend to be complicated in design, so as to be more expensive to produce. For example, in one device, within a larger envelope a removable beverage receptacle is located, while in another prior art device, a conduit leads from a first chamber to both second and third chambers, the flow to the latter chambers being controlled by a complicated valve system. The present invention provides substantial advantages, including simplicity of design and use, etc.

SUMMARY OF THE INVENTION

The present urn comprises a cylindrical envelope or body that defines an interior space and is divided into first and second compartments by a single continuous partition member located in the space and forming with the envelope an integral structure. The urn further comprises separate spouts for the chambers or compartments and heating means in heat transfer relation to the first and second compartments directly, for heating beverages in the urn.

BRIEF DESCRIPTION OF DRAWINGS

FIG. 1 is a side elevation view of the present urn.

FIG. 2 is a sectional top view along axis 2—2 of the device in FIG. 1.

FIG. 3 is a sectional side elevation view along axis 3—3 of the urn in FIG. 2.

PREFERRED EMBODIMENT

Referring to FIGS. 1 to 3, the present beverage urn 10 comprises a body 12 of preferably cylindrical configuration that defines an interior space 14; a single continuous (i.e., no apertures are contained therein) partition member 16 disposed in the space 14 so as to divide the space 14 into first and second compartments 18 and 20, respectively, which partition member 16 and body, or envelope 12, comprise an integral structure, the separate contents of the compartments 18 and 20 (e.g., coffee and tea) not intermingling; separate spout means 22 and 24 on the body 12 that communicate with, respectively, the compartments 18 and 20; and heating means 26 disposed at the body 12 so as to be in direct heat transfer relationship with the compartments 18 and 20 and the respective contents thereof, such direct relationship avoiding any intermediate fluids between the beverage and the heat source. The heating means can comprise, for example, a resistance heating coil 30 and a cord 32 connected thereto and leading to an electrical outlet (not shown, nor is the cord plug, for simplicity).

The urn 10 can further comprise a removable cover 33 that closes the mouth of the body 12 and percolating means 34 that includes a tubular stem 36 and a basket 38 for holding coffee grounds, etc., which percolating means 34 can be located in one compartment (as shown) or both compartments can include respective percolating means.

The partition member 16 preferably is at least co-extensive with the body 12 (i.e., with the space 14) and can even extend up to the cover 33 (in which case the upper end of the partition member 16 can be arcuate). The compartments 18, 20 preferably are each semi-cylindrical.

Relevant hereto are U.S. Pat. Nos. 93,317; 190,135; 213,815; 217,133; and 795,408.

Having thus described the invention, what I claim as new is:

1. A dual compartment urn for providing heated beverages, comprising:
   a. a generally cylindrical body defining an interior space;
   b. a single continuous partition member disposed in said space and dividing said space into first and second compartments, said partition member and said generally cylindrical body comprising an integral structure whereby the respective contents of said compartments are confined thereto;
   c. separate spout means on said generally cylindrical body and communicating with said first and second compartments, respectively;
   d. heating means disposed at said cylindrical body so as to be in heat transfer relationship with said respective contents of said first and second compartments; and
   e. percolating means for holding coffee grounds and the like.

2. An urn as in claim 1, wherein said partition means is at least co-extensive with said cylindrical body.

3. An urn as in claim 1, further comprising cover means.

4. An urn as in claim 1, wherein said compartments are each generally semi-cylindrical in form.

5. An urn as in claim 1, further comprising a cover member, wherein partition member extending to said cover member.

* * * * *